United States Patent [19]

Hagyuda et al.

[11] 4,269,491
[45] May 26, 1981

[54] DISTANCE INFORMATION JUDGING CIRCUIT FOR FOCUS DETECTING APPARATUS

[75] Inventors: Nobuyoshi Hagyuda, Kawasaki; Hiroaki Tanaka, Tokyo, both of Japan

[73] Assignee: Nippon Kogaku K.K., Tokyo, Japan

[21] Appl. No.: 76,551

[22] Filed: Sep. 18, 1979

[51] Int. Cl.³ .............................................. G03B 3/10
[52] U.S. Cl. ........................................... 354/25; 356/4
[58] Field of Search ......................... 354/25; 352/140; 250/201; 356/4; 355/56–59

[56] References Cited

U.S. PATENT DOCUMENTS

| | | | |
|---|---|---|---|
| 3,211,831 | 10/1965 | Steiner | 354/25 X |
| 3,896,304 | 7/1975 | Aoki et al. | 354/25 X |
| 4,135,815 | 1/1979 | Masunaga et al. | 354/25 X |

Primary Examiner—L. T. Hix
Assistant Examiner—W. J. Brady
Attorney, Agent, or Firm—Shapiro and Shapiro

[57] ABSTRACT

A distance information judging circuit for focus detecting apparatus comprises memory means for storing a distance information signal obtained from the focus detecting apparatus for each scan of an optical system,, and coincidence signal generating means adapted for comparing the distance information signal obtained from the focus detecting apparatus in a succeeding scan of the optical system with the distance information signal stored in the memory means and for generating a coincidence signal when the distance information signals coincide each other.

8 Claims, 9 Drawing Figures

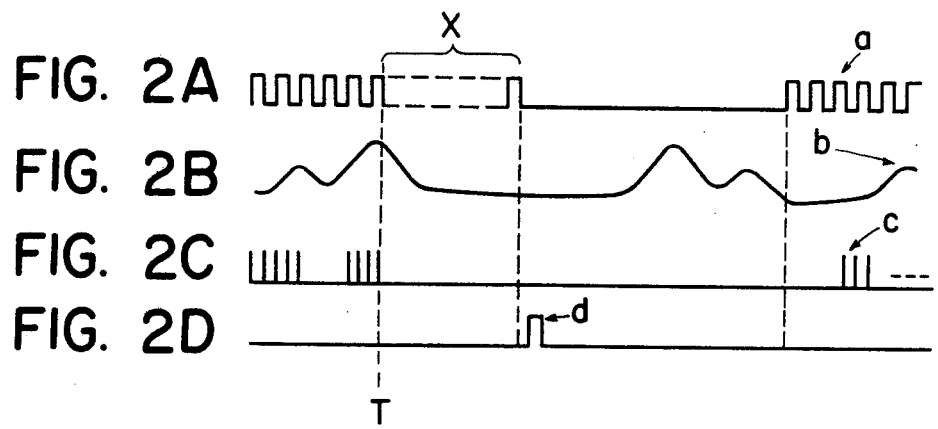
FIG. 2A
FIG. 2B
FIG. 2C
FIG. 2D
FIG. 4
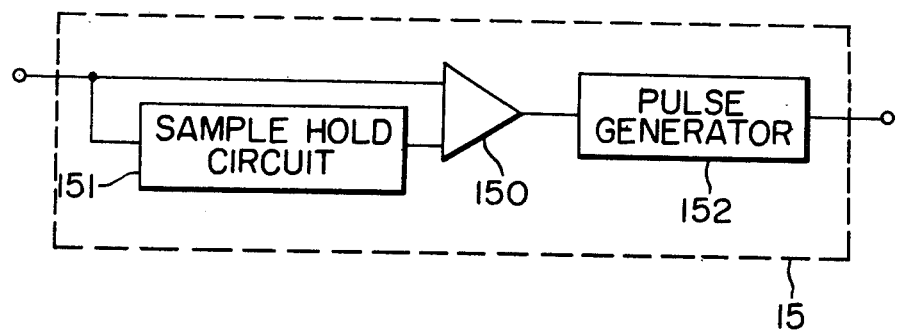
FIG. 6
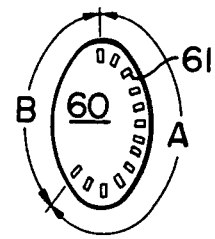

DISTANCE INFORMATION JUDGING CIRCUIT FOR FOCUS DETECTING APPARATUS

BACKGROUND OF THE INVENTION

1. Field of the Invention

The present invention relates to a distance information judging circuit for focus detecting apparatus for use in optical apparatus such as a photographic camera.

2. Description of the Prior Art

There are already proposed various focus detecting apparatus in the prior art, but such conventional apparatus frequently result in erroneous identification of focused position due to false distance information signals resulting from fluctuations in the output signal level of a light-measuring circuit, noise or change of object field caused by the movement of an obstacle into the distance-measuring zone.

SUMMARY OF THE INVENTION

The object of the present invention is to provide a distance information judging circuit for focus detecting apparatus capable of reducing erroneous identification of focused position resulting from a false distance information signal.

BRIEF DESCRIPTION OF THE DRAWINGS

FIGS. 2A, 2B, 2C and 2D are the timing charts showing the functions of the embodiment shown in FIG. 1;

FIG. 4 is a drawing showing the detail of block 15 shown in FIG. 1;

FIG. 6 is a circuit diagram showing another embodiment of the clock 13 shown in FIG. 1.

DESCRIPTION OF THE PREFERRED EMBODIMENTS

Figure 1:
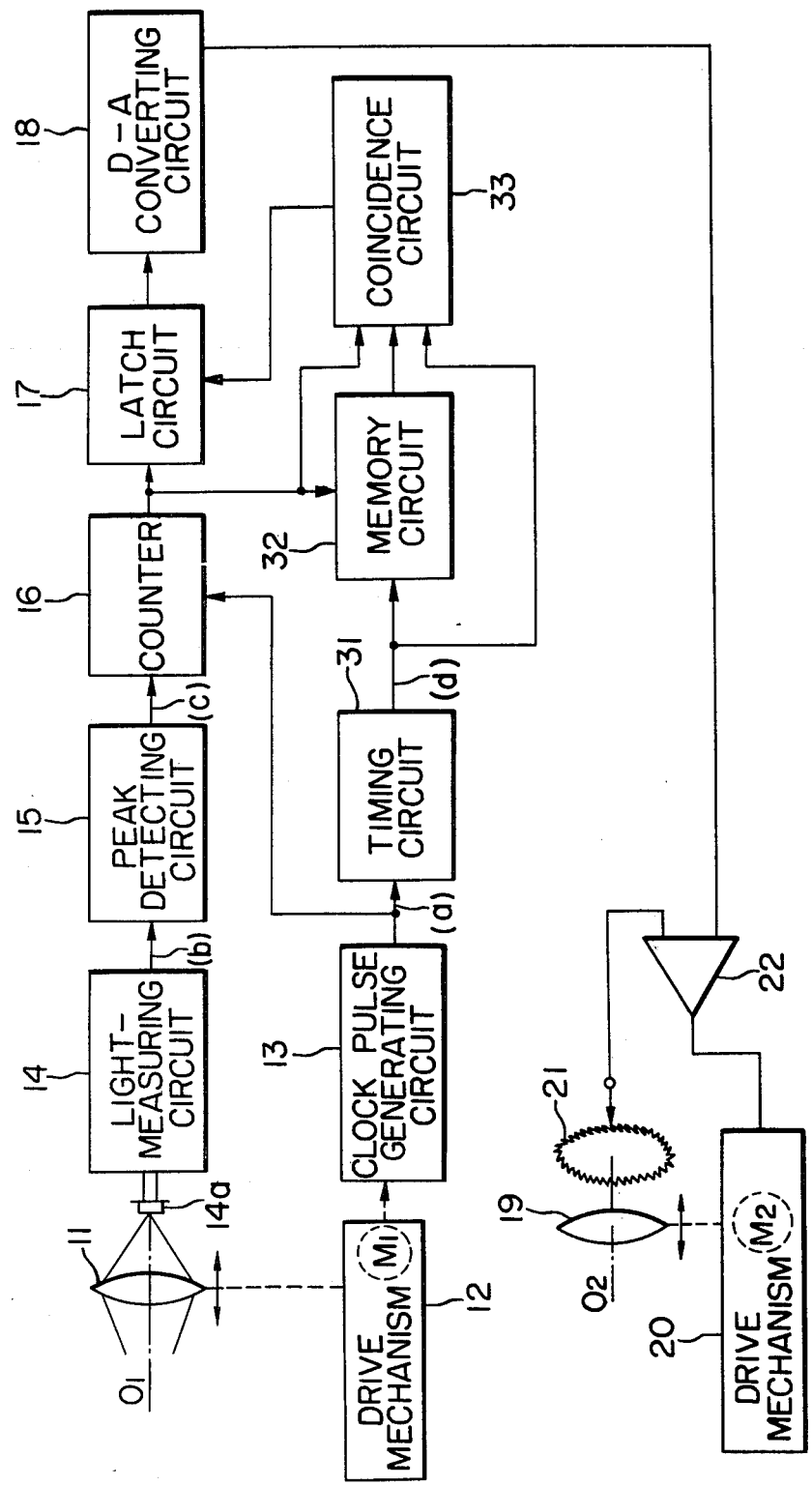
FIG. 1 is a block diagram showing an embodiment of the present invention.

Referring to FIG. 1, a focal distance detecting lens 11 is displaced along the optical axis $0_1$ by means of a drive mechanism 12, including a motor M1, suitable gears, cams, etc. Said detecting lens 11 in the present embodiment is structured to reciprocate or scan between a minimium focal position corresponding to an object located at 1 meter and another focal position corresponding to an object located at infinity. As exemplified in FIG. 3, said displacement of the lens 11 can be achieved, for example, by driving a rack 120 integrally provided on the lens tube 110 by means of a pinion 122 driven by said motor M1. In order to detect the end positions of said detecting lens 11, there are provided, as a part of said drive mechanism 12, a first microswitch 123 which is closed upon contact with said lens tube 110 when said detecting lens is brought to a position corresponding to an object located at 1 meter, and a second microswitch 124 which is closed upon contact with said rack 120 when said detecting lens 11 is brought to a position corresponding to an object located at infinity. A flip-flop 125 is set by a delayed ON signal received from said first microswitch 123 through a delay circuit 126, and is reset by a delayed ON signal received from said second microswitch 124 through a delay circuit 127. A motor drive circuit 128 drives the motor M1 in forward and reverse directions in the set and reset slates of said flip-flop, respectively, thereby displacing the detecting lens 11 in the direction of arrows A and B, respectivey. In FIG. 1, there is also provided a clock pulse generating circuit 13 which generates output pulses (a) in response to the setting of said flip-flop 125, as shown in FIG. 2A, and continues the pulse generation during the said set state. Consequently, the number of pulses generated after the setting of the flip-flop 125 corresponds to the amount of retractive displacement of said detecting lens 11.

The light quantity coming from an object and passing through said detecting lens 11 is measured by a light-measuring circuit 14, including a photoreceptor 14a. The light-measuring circuit itself may be of a known type which is capable of generating a light-measurement output (b) having a peak value corresponding to the position of the highest object contrast. In case plural objects of relatively high contrast are located at different distances in the viewing field, said light-measurement output (b) will accordingly have plural peaks corresponding to the positions of said objects, as shown in FIG. 2B. A peak detecting circuit 15 containing a sample/hold circuit receives said light-measurement output (b) and detects the peak value in the fluctuating component thereof. As exemplified in FIG. 4, said peak detecting circuit 15 is provided with a comparator 150 which receives the output of said light-measuring circuit 140 and the output of the sample/hold circuit 151, which also receives said output of the light-measuring circuit 140. The comparator activates a pulse generator 152 only when the output of the light measuring circuit is larger than the output of the sample/hold circuit, thereby continuously generating pulse when the light-measuring output (b) is increasing, and terminating said pulse generation when said light-measurement output (b) becomes smaller than the sample/hold value. In this manner it is possible to identify the position of the maximum peak value from the time T at which the pulse generation is terminated (cf. FIG. 2D). A counter 16, receiving the clock pulses (a) from the clock pulse generating circuit 13 as an input signal and the pulses (c) from the peak detecting circuit 15 as a reset signal, thus counts the number of clock pulses x (see FIG. 2A) generated by the clock pulse generating circuit 13 during the period from the termination of pulses (c) from the peak detecting circuit 15 to the arrival of the detecting lens 11 at a position corresponding to the object located at infinity. In other words, the count x of said counter 16 corresponds to the amount of advancing displacement of the detecting lens 11 from a position corresponding to the object located at infinity to the focused position. A timing circuit 31 generates a pulse (d) of a predetermined width (see FIG. 2D) indicating the completion of distance measurement when the detecting lens 11, after displacement from a position corresponding to an object distance of 1 meter to a position corresponding to an object distance of infinity, begins a reverse displacement toward said position corresponding to the object distance of 1 meter in each scanning cycle of the detecting lens 11. Since the clock pulse generating circuit 13 generates a predetermined number of pulses during one scanning cycle of the detecting lens 11, said timing circuit 31 may be structured to generate said distance measurement completion pulse (d) upon counting a number of pulses equal to said predetermined number of clock pulses. As an alternative, said timing circuit may also be composed, as shown in FIG.

3, of a monostable multivibrator 310 which generates a pulse of a predetermined width in response to the closing of the aforementioned second microswitch 124. In this case, the duration of the pulse generated by said monostable multivibrator 310 is selected to be shorter than the delay time of the aforementioned delay circuit 127.

A memory circuit 32 stores the contents of said counter 16 upon receipt of said distance measurement completion pulse (d) from said timing circuit 31. A coincidence circuit 33 compares the count stored in said memory circuit 32 with the count of said counter 16 in the succeeding scanning cycle of the lens and generates a coincidence signal if said two counts coincide with each other upon the occurrence of said distance measurement completion pulse (d), as will be explained later. A latch circuit 17 stores the count of the counter 16 upon receipt of the coincidence signal from said coincidence circuit 33. Consequently, the latch circuit 17 performs a memory function only in the event that the counter 16 provides the same count in consecutive scanning cycles. This eliminates error components in the detection signal due to spurous events and thus ensures an exact distance measurement. A digital-analog converting circuit 18 converts the data stored in the latch circuit 17 into an analog voltage.

An objective lens 19, for example, of a photographic camera may be to be displaceable along the direction of optical axis $0_2$ by means of a drive mechanism 20 including a motor M2. A variable resistor 21, such as a potentiometer, is adapted to change its resistance in accordance with the rotation of the motor M2, and, thus, with the position of the objective lens 19, to provide a voltage output corresponding to the position or amount of advancement of said objective lens 19. A servo amplifier 22 is provided to drive the motor M2 in such a manner as to maintain a predetermined relationship between the output voltage of said digital-analog converting circuit 18 and the output voltage of said variable resistor 21. The servo amplifier 22 and the drive mechanism 20 perform a servo control utilizing the output voltage of the digital-analog converting circuit 18 corresponding to the maximum peak value as a reference input voltage and the output voltage of the variable resistor 21 corresponding to the position of the objective lens 19 as a feedback voltage.

Figure 5:
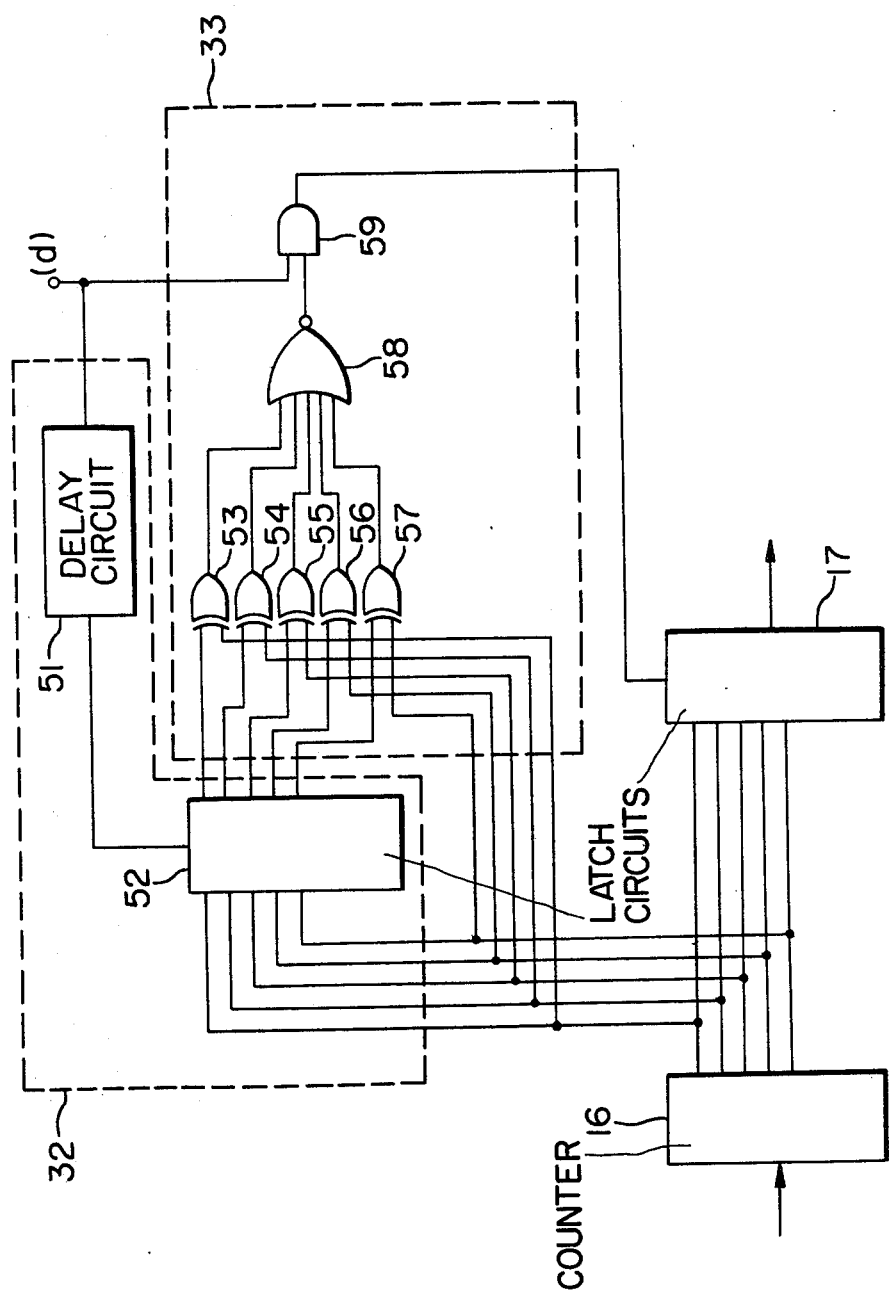
FIG. 5 is a circuit diagram of an embodiment of the judging circuit of the present invention.

An embodiment of the memory circuit 32, the coincidence circuit 33 and the latch circuit 17 will now be described with reference to FIG. 5. In FIG. 5, the distance measurement completion pulse (d) is supplied, after a delay of a predetermined period by a delay circuit 51, to a latch circuit 52, whereby the count of the counter 16 is stored in said latch circuit 52. Thus, the aforementioned memory circuit 32 is composed of said delay circuit 51 and said latch circuit 52. Exclusive OR gates 53-57 respectively receive the memory outputs of the latch circuit 52 and the count of said counter 16. NOR gate 58, receiving the outputs of said exclusive OR gates 53-57, supplies an output signal to an AND gate 59, which also receives the distance measurement completion pulse (d) as another input, and provide an output signal for initiating the write-in or store function of the latch circuit 17. The aforementioned coincidence circuit 33 is composed of the above-explained elements.

Upon receipt of the distance measurement completion pulse (d) in a scanning cycle, the delay circuit 51 supplies said pulse (d), with a delay in excess of the duration of said pulse (d) to the latch circuit 52 to store the count of the counter 16 therein, whereby the exclusive OR gates 53-57, respectively receiving coinciding inputs, produce logic 0 outputs. Consequently, the NOR gate 58 generates a logic 1 output. However, due to the function of the delay circuit 51, the distance measurement completion pulse (d) supplied to the AND gate 59 has already terminated (logic value "0") by this time, and the AND gate 59 therefore produces a logic 0 output, thus inhibiting the write-in of the count of the counter 16 into the latch circuit 17.

Upon receipt of the distance measurement completion pulse (d) in the next succeeding scanning cycle, the AND gate 59 accordingly receives a logic "1" input. If the count of the counter 16 at this moment is identical to the count stored in the latch circuit 52, the exclusive OR gates 53-57 produce the logic "0" outputs whereby the NOR gate 58 supplies another logic "1" input to said AND gate 59, which thus produces a logic "1", output initiating write-in of the count of counter 16 into the latch circuit 17. In the event that the output of the latch circuit 52 does not coincide with that of the counter 16 at the receipt of the second distance measurement completion pulse (d), the write-in function of the latch circuit 17 is naturally not conducted.

It will also be understood that the foregoing embodiment can be modified, without substantial change in its effect and function, in such a manner as to perform the above-explained distance judging function in every other scanning cycle by means of a frequency dividing circuit for said distance measurement completion pulses. Also, said coincidence circuit may be in analog form instead of digital form. Furthermore, it is also possible to perform a so-called through-the-lens distance measurement in which the objective lens 19 is used also as the detecting lens 11.

Figure 3:
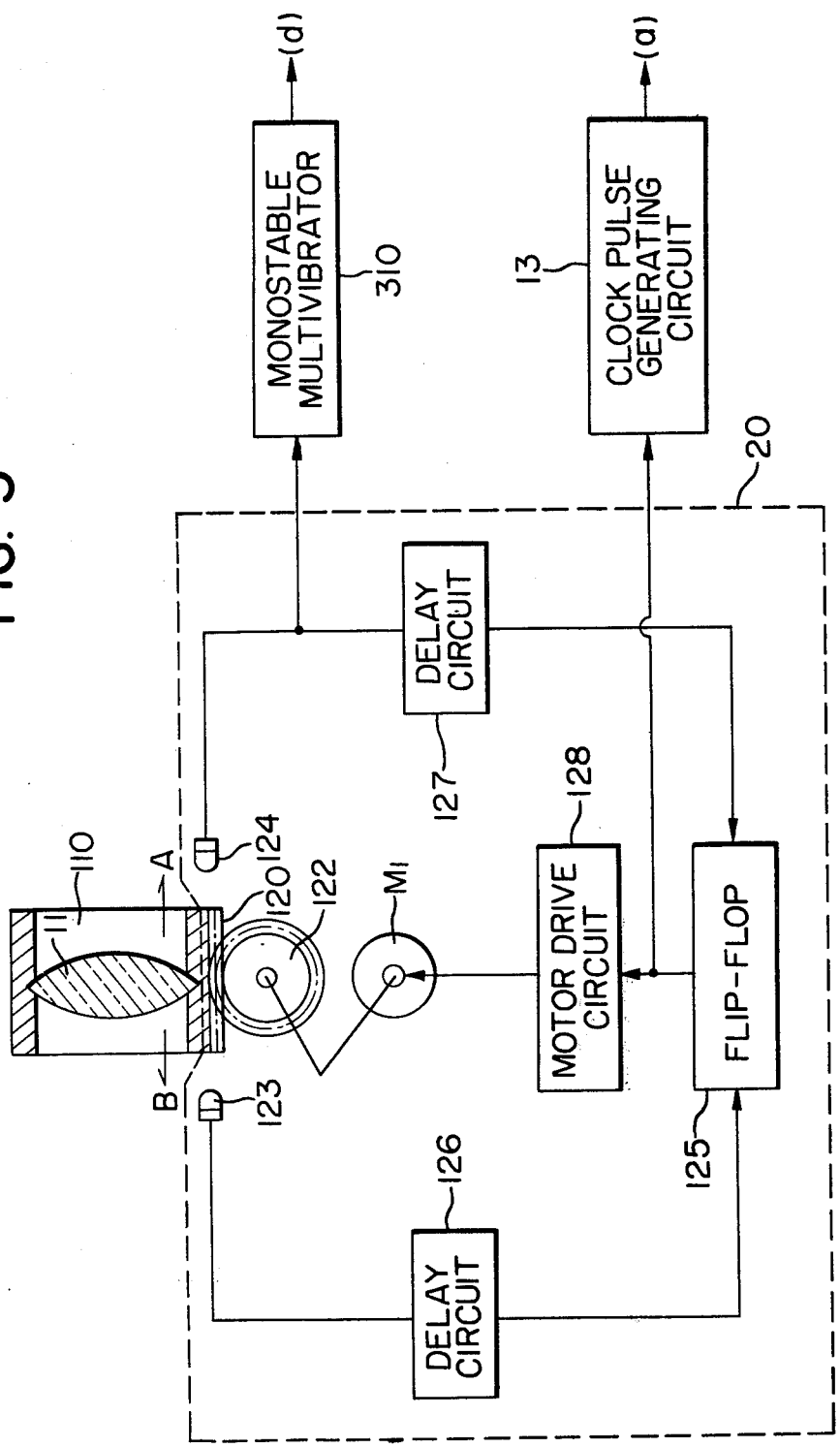
FIG. 3 is a drawing showing a part of the block diagram shown in FIG. 1.

Furthermore, although the motor in the embodiment of FIG. 3 is driven both in the forward and in the reverse directions, it is also possible to rotate the motor in one direction and to convert said rotation into reciprocating motion of the lens by means of a suitable cam mechanism. In this case, the clock pulse generating circuit 13 may be conveniently composed, as shown in FIG. 6, of a disc 60 performing a full rotation corresponding to one reciprocating cycle of the lens and provided, on a part of its periphery, with slits 61 for guiding the light from a light source (not shown) to a photoreceptor (not shown), so that the slitted portion A of the disc passes between said light source and said photoreceptor during the forward motion of the lens, while the unslitted portion B of said disk passes between said light source and photoreceptor during the reverse motion of said lens. This embodiment will be understood as a modification of photoelectric encoder and allows one to obtain the pulses shown in FIG. 2A by suitable wave shaping on the output of the photoreceptor.

As explained in the foregoing, the present invention reduces the fluctuation in the output of the latch circuit 16, which results in a reduction in the power consumption of the motor in the automatic focusing operation, and prevents fluctuations in the focused position of a camera.

Furthermore, although the foregoing explanation is in connection with the detection of focus position by using, the peak voltage obtained by scanning with a detecting lens, it will be understood that the present invention is by no means limited to such an embodiment but is similarly applicable to other focus detecting apparatus, for example, by matching double images obtained by mirror scanning.

As explained in the foregoing, the present invention provides a judging circuit for a focus detecting apparatus which is capable of preventing erroneous identification of focus position resulting from a false distance information signal, and permits a photographing operation with appropriate focusing even when the object is not located in the distance-measuring zone in the viewing field at the moment of photographing, since the distance information is not lost until the detecting cycle is conducted at least twice. This ensures exact focusing of the object without the focus being affected by an obstacle passing in front of the object or by spurious signals.

We claim:

1. A distance information judging circuit responsive to the distance information signals produced by a focus detecting apparatus in an optical system for providing a distance information signal corresponding to the focused position of the optical system, comprising:
   means for scanning the optical system between an infinite focal position and a minimum focal position;
   memory means for storing a first distance information signal obtained from said focus detecting apparatus during a first scan of said optical system; and
   coincidence signal generating means for comparing a second distance information signal obtained from said focus detecting apparatus during a succeeding scan of said optical system with the first distance information signal stored in said memory means and for generating a coincidence signal when said distance information signals coincide with each other.

2. A distance information judging circuit according to claim 1, wherein said memory means includes a memory circuit and a delay circuit for causing said second distance information signal from said focus detecting apparatus to be stored in said memory circuit after a predetermined time delay.

3. A distance information judging circuit according to claim 2, wherein said predetermined time delay is greater than the time required for comparing said first and second distance information signals.

4. A distance information judging circuit according to claim 1 further comprising additional memory means responsive to the coincidence signal for storing the second distance information signal.

5. A distance information judging circuit according to claim 4 further comprising drive means responsive to the second distance information signal stored in said additional memory means for driving the optical system to focused position.

6. A distance information judging circuit according to claim 1, wherein said focus detecting apparatus includes means for measuring the light received by the optical system and for photoelectrically converting the measured values of light into electrical signals, and peak detecting means for detecting the peak value of said electrical signals, and wherein said distance information judging circuit further comprises pulse generating means for generating a predetermined number of pulses during each scan of said optical system, and counter means for counting the number of pulses between the focal position of said optical system at which said peak value occurs and a predetermined focal position, said first and second distance information signal corresponding, respectively, to the number of pulses counted by said counter means during successive scans.

7. A distance information judging circuit according to claim 1 or 6, wherein the optical system is scanned by reciprocating the optical system between said infinite and said minimum focal positions, and wherein the first and second distance information signals are produced during successive movements of the optical system in the same direction.

8. A distance information judging circuit according to claim 1 further comprising means for continuously scanning the optical system.

* * * * *